United States Patent [19]

Salmi et al.

[11] Patent Number: 4,934,465
[45] Date of Patent: Jun. 19, 1990

[54] ARRANGEMENT FOR THE AXIAL BEARING OF A DRILLING MACHINE

[75] Inventors: Pekka Salmi; Timo Kiikka, both of Tampere; Timo Muuttonen, Siuro, all of Finland

[73] Assignee: OY Tampella AB, Tampere, Finland

[21] Appl. No.: 40,499

[22] Filed: Apr. 20, 1987

[30] Foreign Application Priority Data

May 2, 1986 [FI] Finland .................................. 861851

[51] Int. Cl.⁵ .............................................. B23B 45/16
[52] U.S. Cl. ..................................... 173/139; 92/85 R
[58] Field of Search ....................... 173/139, 128, 134; 92/84, 85 R, 143

[56] References Cited

U.S. PATENT DOCUMENTS 4,262,755 4/1981 Kuhn ............................... 173/139 X
4,343,368 8/1982 Fadeer et al. ........................ 173/139
4,703,838 11/1987 Roussen et al. ................. 173/139 X Primary Examiner—Frank T. Yost
Assistant Examiner—Willmon Fridie, Jr.
Attorney, Agent, or Firm—Ladas & Parry

[57] ABSTRACT

The invention relates to an arrangement for the axial bearing of the drilling machine. The drilling machine thereby comprises a body (6), a percussion device (1) fitted in the body, and a rotation bushing (3) functioning as a rotating means of a shank (2) positioned on an axial extension of the percussion device. Furthermore, an axial bearing is fitted within the body (6) for receiving the axial forces exerted on the body (6) through the shank (2). In order to provide resilience, the axial bearing is arranged to be displaceable in the axial direction under the influence of a pressure medium acting thereon. To resiliently receive a percussion impulse reflected from the rock during the drilling process, the pressure and volume flow of the pressure medium of the axial bearing is adjustable so that the position (Y) of the axial bearing is between the extreme positions (0,ΔX) of the axial bearing under the normal operating conditions of the drilling machine.

12 Claims, 3 Drawing Sheets

ARRANGEMENT FOR THE AXIAL BEARING OF A DRILLING MACHINE

The invention relates to an arrangement for the axial bearing of a drilling machine which comprises a body, a percussion device fitted in the body, a rotation bushing which functions as a rotating means of a shank positioned on an axial extension of the percussion device, and an axial bearing fitted in the body for receiving the axial forces exerted on the body through the shank, said axial bearing being axially displaceable under the influence of a pressure medium acting thereon so as to obtain resilience.

In prior hydraulic percussion drilling machines, the percussion device fitted in the body is intended to direct successive axial percussions on a shank which is to be fastened to a drill rod. The shank is mounted in the body rotatably and axially slideably, e.g. by means of a rotation bushing which is in engagement with a rotation machinery supported by the body. The body, in turn, is supported by and fastened to a feeding carriage on which the drilling machine is displaceable along the feeding beam of the drilling equipment.

In rock drilling, a percussion impulse is reflected from the rock to the drilling machine, and the force created by the impulse has to be received somehow in the drilling machine. Various resilient axial bearing solutions have been developed for receiving this force in order to protect the drilling machine against reflecting percussion-like strain impulses. Known resilient axial bearing solutions include the solutions disclosed in Finnish Patent Specification 58,816, German Auslegeschrift 2,738,956, Swedish Published Specification 440,873 and German Offenlegungsschrift 2,610,619.

A disadvantage of these known resilient axial bearing solutions is, i.a., their complexity, that they require a number of sealings, and that no possibility to adjust the resilience is provided, i.e. the rigidity of known axial bearings is constant. A further disadvantage is that the resilience effect has a delayed action and is dependent on the feeding force exerted on the drilling machine.

The object of the invention is to provide an arrangement for the axial bearing of a drilling machine, by means of which the above disadvantages of the prior art can be eliminated. This is achieved by means of an arrangement according to the invention, which is characterized in that the pressure and volume flow of the pressure medium of the axial bearing are adjustable so that the position of the axial bearing under the normal operating conditions of the drilling machine is between the extreme positions of the axial bearing.

An advantage of the arrangement according to the invention is that the axial bearing can be adjusted in such a manner that the reaction to the reflection impulse acting on the shank is not delayed. A further advantage is that the resilience of the axial bearing can be made such that the pressing reflection acting on the shank is prevented from changing into a pulling reflection straining the drilling equipment, as a result of which the strains exerted on the drilling machine are reduced considerably as compared with the prior art. The structure according to the invention is simple, because no sealings are needed, for instance. On account of the simple structure, the manufacture and maintenance costs are low compared with the prior art.

The invention will be described in the following in more detail by means of some preferred embodiments shown in the attached drawings, wherein FIG. 1 is a general side view of a drilling machine provided with an axial bearing arrangement according to the invention, FIG. 2 is a sectional view along the arrows II—II shown in FIG. 1, FIG. 3 is an enlarged view of the arrangement according to the invention, FIG. 4 illustrates the arrangement of FIG. 3 after the percussion piston has completed a stroke, FIG. 5 illustrates the arrangement according to FIGS. 3 and 4 after the displacement of the pistons, FIG. 6 is a general view of a drilling machine provided with an arrangement according to another embodiment of the invention.

Figure 1:
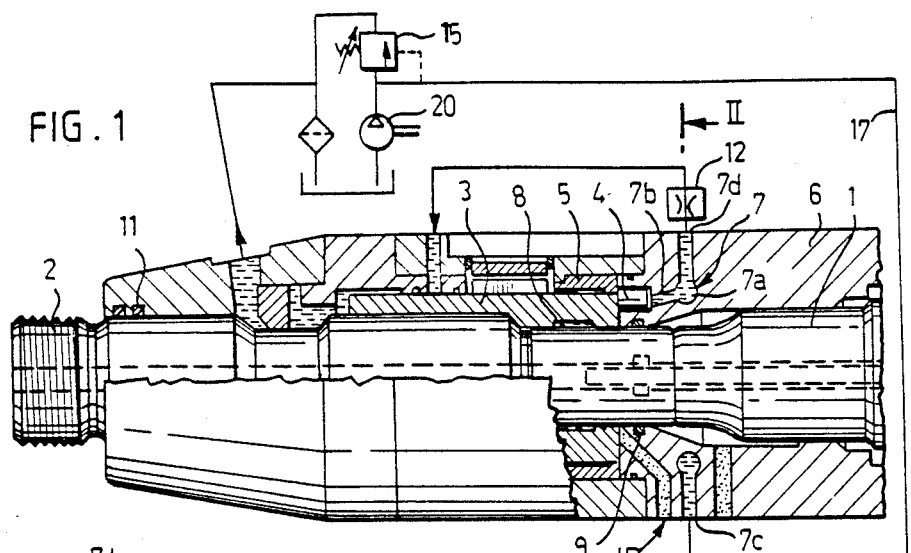

In the example of FIG. 1 a percussion piston 1 is displaceable within a body 6, which is formed by a number of parts in a manner known per se. A shank 2 is supported on the body so as to be axially displaceable and rotatable. The rotatory motion of the shank 2 is effected by means of a separate hydraulic motor and a gear drive. The hydraulic motor and the gear drive are not shown in the figures. The outer periphery of a rotation bushing 3 is provided with a cogging which fits said gear. The inner surface of the rotation bushing 3 is provided with engaging cogs which are axially displaceable with respect to the engaging cogging of the shank. The outer periphery of the rotation bushing 3 is at both ends thereof mounted radially in the body 6. The shank 2 is mounted in the body 6 at the forward end thereof, the rear end thereof being mounted axially in the rotation bushing 3 by means of a bearing 8.

The above matters are obvious to one skilled in the art, so these details and their function will not be more closely described in this connection.

Figure 2:
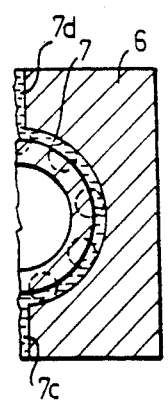

A resilient axial pressure bearing is fitted in the body 6 for receiving percussion impulses reflecting from the rock to the drilling machine, the resilience of the pressure bearing being provided by arranging it to be axially displaceable under the influence of a pressure medium acting thereon. According to the invention the pressure and the volume flow of the pressure medium of the axial bearing are adjustable so that the position of the axial bearing under normal operating conditions is between the extreme positions of the axial bearing. The axial bearing preferably comprises a plurality of pistons 4, which are arranged in the body at uniform intervals in axial chambers arranged circumferentially around the shank 2 and communicating with each other through a piping 7. This structure appears particularly clearly from FIG. 2.

As is apparent from FIG. 1, the piping 7 is arranged to open into the bottoms of the chambers behind the pistons fitted in the chambers. In connection with this expression, it is assumed that the drilling machine is viewed in the feeding direction. The piping 7 is formed by an annular channel 7a, channels 7b interconnecting said channel 7a and the chambers, and an inlet and an outlet channel 7c, 7d. In the example of FIG. 1 a choke 12 is provided in the outlet channel 7d for regulating the lubricant flow to the coupling of the shank. Hydraulic components to be described below are attached to the inlet channel 7c for regulating the flow and the pressure of the pressure medium in the piping 7 of the axial bearing.

The forward movement of the pistons 4 of the axial bearing is limited by means of a ring 5 provided in the body 6, the inner periphery of which ring is smaller than the periphery of an envelope drawn around the outer edges of the pistons 4. The backward movement of each piston 4 is limited by the bottom of the corresponding chamber. The rotation bushing 3 is at the forward end thereof mounted axially in the body 6 and at the rear end thereof to the end faces of the pistons 4. Since the pistons 4 are arranged in position without any sealings, the pressure fluid tends to leak. A sealing 9 is provided at the rear end of the shank in the body 6 in order to prevent the pressure fluid from getting into the percussion space. A sealing 11, in turn, prevents the oil acting as a pressure fluid from getting out through the front portion of the body 6. The expression "forwards" as used herein refers to the movement in the feeding direction of the drilling machine and the expression "backwards" correspondingly to the movement opposite to the feeding direction.

The structure and lubrication of the rotation bushing 3 and the coupling of the shank 2 may be such as described in e.g. Finnish Patent Specification 66,459. As to the lubrication, it may be mentioned herein that air is applied to the rear end of the shank 2 in front of the sealing 9. The blowing of air is indicated in FIG. 1 by means of the reference IP. The function of the air is to convey the oil to the lubrication points on the bearings and to compensate for flow variations and to prevent cavitation. The air is removed from the oil before the oil is filtered and passed into a tank.

Figure 3:
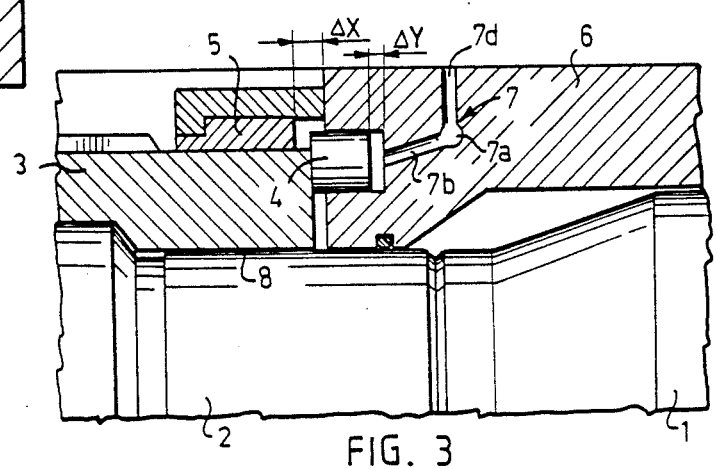
Figure 4:
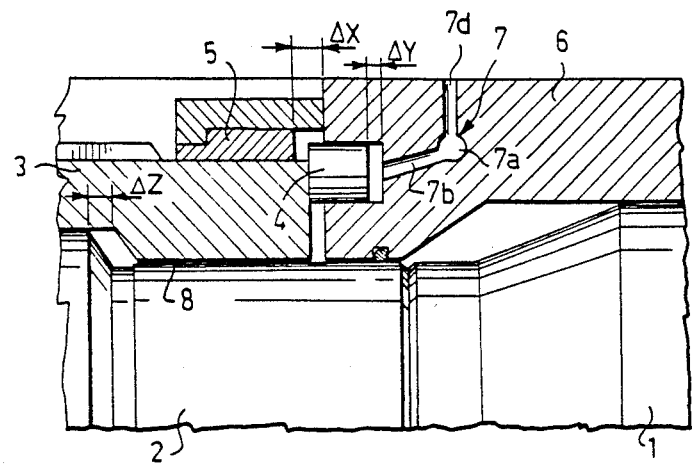
Figure 5:
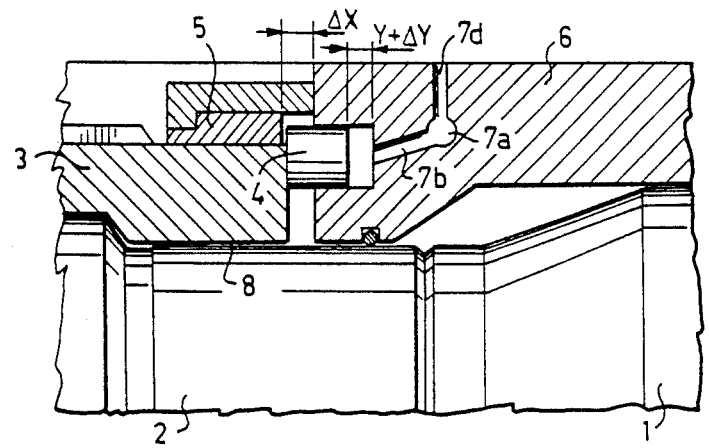

The axial bearing used in the embodiment of FIG. 1 is shown on enlarged scale in FIGS. 3 to 5. The invention will be described in the following with reference to these figures.

In FIG. 3 the limited range of movement of the pistons 4 of the axial bearing is indicated with the reference $\Delta X$. The expression "limited range of movement" as used herein means the axial range of movement within which the piston is able to move. The range of movement is limited by means of the ring 5 and the bottom of the chamber, as discloed above. In FIG. 3, the piston 4 is in a position Y as measured from the bottom of the chamber. The pressure supplied to the piping 7 exerts a force on the pistons 4 so that each piston 4 bears on the rotation bushing 3, which, in turn, bears on the shank 2. This situation is shown in FIG. 3.

A stroke of the percussion piston 1 on the head of the shank 2 effects a step-like and rapid displacement $\Delta Z$ of the shank. This is illustrated in FIG. 4.

Thereafter the rotation bushing 3 is displaced by the pistons 4 so that it rapidly follows the movement of the shank 2 so that the rotation bushing is again pressed against the shank 2. This is illustrated in FIG. 5.

After the stroke produced by the percussion piston 1, a stress impulse reflected from the rock effects a steplike rapid displacement of the shank 2 in a direction opposite to the one mentioned above. On the arrival of the reflected impulse, the rotation bushing 3, however, is in the position shown in FIG. 5, wherefore the axial movement of the shank 2 is received by the resilient pistons 4 of the axial bearing. Since the pistons 4 and the rotation bushing follow the movements of the shank substantially without any delay, the reflection impulse acting on the shank 2 can be received by the pistons of the axial bearing irrespective of the incoming delay of the reflection impulse.

If a situation should arise in which the pistons 4 are displaced to their foremost extreme position, i.e. $Y = \Delta X$, the pistons 4 are not able to follow any further displacement of the shank. The shank 2 would thereby be left without any support that the reflected pressing stress impulse acting on the shank would be turned back as a pulling impulse which strains the equipment and its connections. The rotation bushing 3 is displaced by the feeding force exerted on the drilling machine so that it catches up with the shank 2. However, this takes place with a great delay during which time the pistons 4 of the axial bearing are not able to damp the reflection impulses acting on the shank.

On the other hand, it can be noted that the resilience is wholly prevented when the pistons 4 are in their rearmost extreme positions, i.e. when $Y = 0$.

On the basis of the matters set forth above it can be noted that the pistons have to be positioned between the above-mentioned extreme positions during the operation of the drilling machine in order to obtain the operation according to FIGS. 3 to 5, i.e. resilience under all conditions. Accordingly, the position of the piston has to fulfill the following condition:

$$0 < Y < \Delta X$$

This condition implies that the pressure and volume flow of the pressure medium of the axial bearing is adjusted so that the position of the pistons under normal conditions is always between the extreme positions, so that the movement of the damping pistons 4 in both directions is possible under all normal operating conditions.

FIG. 1 illustrates one preferred hydraulic connection by means of which the operation described above can be effected. The hydraulic fluid used as a pressure medium is fed by means of a pump 20 through a channel 17 into the inlet channel 7a through a resistance counter valve 13. A desired operation is obtained by suitably adjusting the pressure level of the system by means of a pressure regulating valve 15. The resilience of the axial bearing can be adjusted to a desired value by means of the resistance counter valve 13. The speed of the pistons 4 is effected by means of a pressure accumulator 14, which pressurizes the piping 7 through the counter valve 13.

Figure 6:
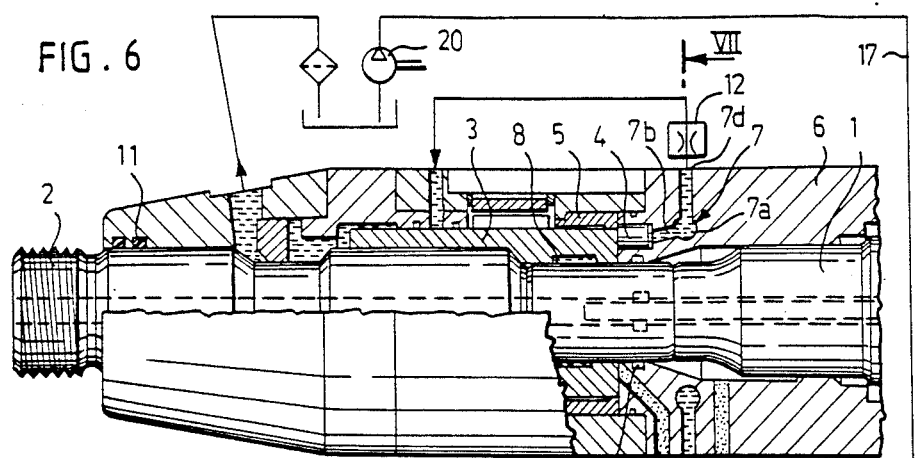
Figure 7:
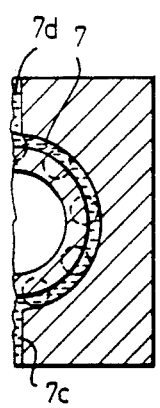
FIG. 7 is a sectional view along the arrows VII—VII shown FIG. 6.
Figure 8:
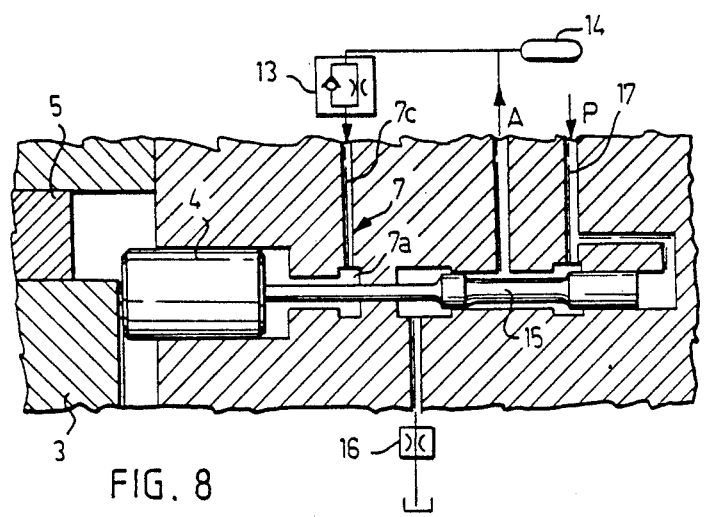
FIG. 8 illustrates one preferred embodiment of the arrangement according to FIG. 7.

FIGS. 6 to 8 illustrate another embodiment of the invention, in which the axial bearing itself is similar to that of the embodiment of FIG. 1, while the hydraulic connection differs from the hydraulic connection of FIG. 1.

In the example of FIGS. 6 to 8 the average pressure of the piping 7 is adjusted by means of the valve 15. The valve 15 can thereby be controlled e.g. mechanically on the basis of the position of one piston 4. One way to realize such a control is shown in FIG. 8.

In the realization of FIG. 8 the pressure regulating valve 15 is formed by a spindle connected mechanically to one of the pistons 4. Thereby the piston 4 directly controls the spindle 15, which, in turn, adjusts the pressure of a channel A (FIG. 8) connected to the inlet channel 7c of the axial bearing either to a pressure P of the pump 20 (channel 17) or to the pressure of a choked tank connection 16 (FIG. 8), depending on the position of the piston 4. When the piston 4 approaches the foremost limiting means, the pressure is reduced in the piping 7 and, correspondingly, when the piston 4 approaches the rearmost extreme position, the pressure is increased in the piping 7. In this way, the average position of the piston remains between the extreme positions.

The above embodiments are by no means intended to restrict the invention, but the invention can be modified in various ways within the scope of the claims. Accordingly, it is obvious that the invention or the parts thereof do not need to be exactly similar to those shown in the figures, but that other kinds of solutions are possible as well. In the embodiment of FIG. 6, the valve 15 can also be controlled by means of a signal obtained from a measuring sensor measuring the average position of one piston. The valve 15 may thereby be e.g. an electrical proportioning valve. The chambers in which the pistons are positioned can be constructed in any suitable manner e.g. by boring cylinders of suitable size in the body. Correspondingly, the pistons can be made of straight cylinder pins, etc. Even the axial bearing, need not necessarily be formed by pistons according to the figures, but other kind of solutions are possible as well, e.g. a bearing formed by a low cylindrical body, etc. The hydraulic system used for the adjustment of the axial bearing may be connected in series with the lubrication system of the coupling of the shank, as appears from the figures, but this is not the only possibility, since it is also possible that the adjusting system of the axial bearing and the lubrication system of the coupling of the shank are separate independent systems, if this is regarded as necessary.

We claim:

1. An arrangement for the axial bearing of a drilling machine comprising:
    a body
    a percussion device fitted in the body;
    a rotation bushing which functions as a rotating means of a shank positioned on an axial extension of the percussion device; and
    an axial bearing fitted in the body, and adjacent to said shank, for receiving the impact reflective forces exerted on the body through the shank, said axial bearing being axially displaceable under the influence of a pressure medium acting thereon so as to be resilient, wherein the pressure and volume flow of the pressure medium are adjustable so that the position of the axial bearing under normal operating conditions of the drilling machine is between the extreme force and aft positions of the axial bearing.

2. An arrangement according to claim 1, wherein the axial bearing is formed by a plurality of pistons which are fitted in axial chambers arranged within the body circumferentially around the shank and communicating with each other through a piping.

3. An arrangement according to claim 1 wherein the pressure of the pressure medium fed into the piping is adjustable to a desired level by means of a pressure regulating valve arranged on the delivery side of a pump feeding the pressure medium, that the pressure medium is arranged to be fed into the piping through a resistance counter valve, that the resilience of the axial bearing is adjustable by means of the resistance counter valve and that the pressurizing of the pressure medium for effecting a rapid movement of the pistons is arranged to be carried out by means of a pressure accumulator connected to the piping through the resistance counter valve.

4. An arrangement according to claim 1, wherein the pressure adjustment of the piping is arranged to be carried out by adjusting the average pressure of the piping by means of a pressure regulating valve provided on the delivery side of a pump feeding the pressure medium.

5. An arrangement according to claim 4, wherein the adjustment of the pressure regulating valve is arranged to be carried out on the basis of the position of one of the pistons.

6. An arrangement according to claim 5, wherein the pressure regulating valve is formed by spindle connected mechanically to the piston and arranged to regulate the pressure of the pressure medium to be fed into the piping between the pressure of the pump and the pressure of a choked tank connection, depending on the position of the piston.

7. An arrangement according to claim 4, wherein the pressure regulating valve is an electrical proportioning valve adjustable by means of a signal from a measuring sensor measuring the average position of the piston.

8. An arrangement according to claim 1, wherein the pressure medium system adjusting the position of the axial bearing is connected in series with the lubrication system of the coupling of the shank through a choke.

9. An arrangement according to claim 1, wherein the end faces of the pistons function as bearing surfaces for the rotation bushing.

10. An arrangement according to claim 2, wherein the pistons are made of a wear-resistance material.

11. An arrangement according to claim 10, wherein the pistons are made of hard metal.

12. An arrangement according to claim 10, wherein the pistons are made of stellite.

* * * * *